J. C. McCOY.
FISHING CHAIR.
APPLICATION FILED MAR. 28, 1921.
1,406,571.
Patented Feb. 14, 1922.
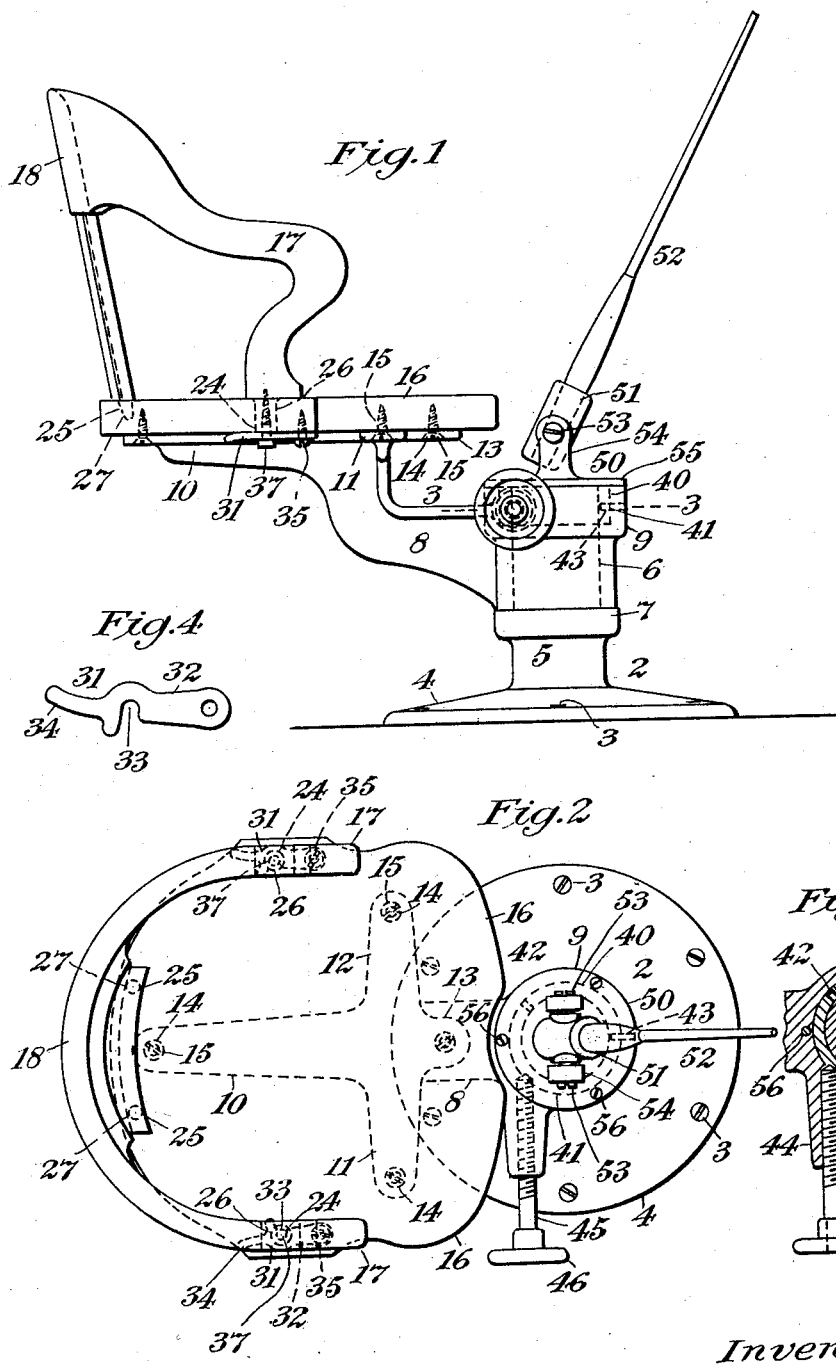

UNITED STATES PATENT OFFICE.

JAMES C. McCOY, OF NEW YORK, N. Y.

FISHING CHAIR.

1,406,571.  Specification of Letters Patent.  Patented Feb. 14, 1922.

Application filed March 28, 1921. Serial No. 456,346.

*To all whom it may concern:*

Be it known that I, JAMES C. McCoy, a citizen of the United States, and a resident of New York, in the county of New York and State of New York, have invented certain new and useful Improvements in Fishing Chairs, of which the following is a specification.

This invention relates to chairs for use in fishing for large game fish such as sword fish and the like, and its principal object is to provide a fishing chair which is specially adapted to boat service, and particularly motor boat service. Heretofore chairs have been used in such fishing but those which have been so used are not well adapted to this particular purpose as they have many faults when used for handling large fish so that such fishing is at present rendered much more difficult than is the case when my improvements are used.

In my present invention I have overcome the principal faults of such chairs, and am able to control the movements of a large fish with far greater facility than would be possible when using an ordinary fishing chair. It is essential that an efficient fishing chair shall be adapted to turn to all points of the compass, but that such movement shall be controllable, so that the rolling and pitching of the boat will not cause the chair to swing around, and it is also important that the pull of the fish on the rod shall not bring about turning of the chair.

I have provided means whereby such chair movements can be controlled at will, to a greater or less degree, and have also provided means whereby the position of the chair can be shifted with greater certainty than heretofore. This consists partly in the improved position given to the seat whereby the fisherman can shift the chair by the aid of his feet with greater ease and certainty than formerly.

The means I prefer to employ to accomplish the above-mentioned object together with other features of my improved fishing chair, are illustrated in the drawing accompanying and forming part of this specification, and in which—

Figure 1 is a side elevation of my improved fishing chair.

Fig. 2 is a plan of the same.

Fig. 3 is a section on the line 3—3 of Fig. 1, and

Fig. 4 is a detail plan of a clamp to secure the chair arms to the seat.

Like characters of reference refer to like parts in all the figures of the drawing.

As this type of chair is subjected to violent and sudden shocks by the rolling and pitching of the boat, and to sudden movements of large fish on the fishing rod held by means of a rod rest on the chair, I have provided a substantial supporting member on which the other parts of the chair are mounted. In the various figures of the drawing, the numeral 2 designates the said supporting member which may be of any suitable form adapted to be secured to the deck or other woodwork of a boat. I preferably employ countersunk wood screws 3 applied in suitable holes in the flange 4 of the supporting member 2. The upper part of the supporting member is preferably in the form of a column such as 5, and has a cylindrical bearing 6 and a shoulder 7.

Mounted on the bearing 6, against the shoulder 7, is the hub 9 of a swinging member or bracket 8 adapted to turn on its cylindrical bore about the bearing 6. On the member 8 are provided means to hold a chair seat at one side of the bearing 6, and such means are preferably arranged by extending said bracket to one side of the bearing and then extending it upward to form four branches such as 10, 11, 12 and 13. The said branches are provided with holes 14 through which are passed wood screws 15 into the chair seat 16 which is preferably of wood.

Secured to the chair seat are suitable arms such as 17 and a back as 18 arranged so as to be readily removed when desired. Ordinarily the chair seat is provided with sockets 24 at each side, and 25 at the back, into which projections or pins 26 and 27 formed respectively on the lower parts of the arms and on the lower portion of the back, can be pushed to secure said arms and back to the seat. The said arms and back are assembled to form one connected member that can be lifted off or onto the chair seat and be secured thereon by forcing the projections or pins into the said sockets.

When the fisherman is waiting for a fish to take the baited hook, he ordinarily has the arms and back in place on the chair seat as it may be hours before a fish is hooked, but as soon as a fish is hooked, the arms and back are usually removed by an attendant, so that the fisherman will have more freedom of movement.

The back is merely held by the projections or pins 27 but the arms are also held by clamps 31 in addition to the pins or projections 26, so that on unlatching the clamps or hooks 31, the back and arms can be pulled upward and removed from the chair. Each clamp or hook 31 consists of a main portion 32, a slot 33, and a handle 34, and is secured to and turns on a screw 35 in the under side of the chair seat. The sides of the slot 33 lock against the screw 37 in the projection or pin 26, clamping the chair arm securely to the seat portion 16.

Any suitable means may be provided to control the movement of the member 8 on the bearing 6 but preferably the hub 9 of the member 8 is provided with a recess 40 in which is placed a metallic ring 41, split at 42, and held from turning by a pin 43. A projection 44 is formed at the right hand side of the hub 9, and in said projection is threaded a screw 45 which bears on one side of the ring 41. On the right hand end of said screw is secured a hand wheel 46, by means of which the screw may be turned, so that on turning the screw, the pressure of the ring on the bearing 6 may be increased or decreased at will.

It will be noted that the hand wheel 46 is placed so as to be conveniently reached by the fisherman's right hand, and consequently he is able to quickly increase or decrease the braking effect of the split ring 41 on the bearing 6 if the rolling of the boat or the position of the fish makes either movement desirable.

I provide suitable means for supporting the fishing rod on my improved chair and ordinarily employ one of the rod rests now on the market. Such a rod rest is illustrated in Figs. 1 and 2 and indicated by the number 50. It embodies a socket 51 in which the rod 52 is held, and the socket is pivoted by screws 53 in ears 54 formed on the base 55. The latter is secured to the hub 9 of the bracket 8 by screws 56 and turns with said bracket so that the rod and chair seat turn together about the same center, and the rod can be oscillated up and down in following or retarding the movements of a fish. From the foregoing it will be clear that the fishing chair and rod rest unite in a common movement and function for controlling the direction of the rod which is very advantageous and an important forward step in the art. In the old style of fishing chair the fisherman is restricted substantially to the use of the arms while in my improved fishing chair I am able to make use of the strength of other parts of the body together with the arms in controlling the rod and combating the movements of the fish. This is clearly very advantageous and greatly increases the efficiency of the fisherman and renders his efforts more likely to be successful in overcoming a large fish.

What I claim is:—

1. In a fishing chair, the combination with a supporting member, and a rotatable member thereon carrying a seat portion, of mechanism to control the rotation of the rotatable elements to a greater or less degree which includes a compressible ring in said rotatable member bearing on the supporting member, a clamping screw, and means whereby the screw can be adjusted from the seat portion.

2. In a fishing chair, the combination of a supporting column, a swinging member journaled on said column, a seat portion on the swinging member at one side of the axis thereof, and a rod rest secured to the swinging member at or below the level of the seat portion and having a rod-holding portion rotatable on the same axis as the swinging member.

3. In a fishing chair, the combination with a stationary supporting column, a swinging member journaled on the upper part of the column, and a seat portion on the swinging member, of means to control the rotation of the swinging member which include a compressible ring in said member, surrounding the column and movable with the swinging member, a screw to clamp the ring against the column to a greater or less degree, and a hand wheel at one side of the seat portion to operate the screw.

4. In a fishing chair, in combination, a supporting column having an end thrust bearing and a cylindrical bearing, a swinging arm having extending portions and a hub journaled on said bearing portions, a removable back and arms secured on the seat portion, a rod-rest embodying a rod-socket, and pivots therefor movable on the same axis as the hub, a clamp-ring in a recess in said hub and adapted to clamp on the cylindrical bearing of the column, and a clamping screw in the hub eccentric of the ring recess and adapted to clamp said ring.

Signed at New York, in the county of New York, and State of New York, this 23rd day of March, A. D. 1921.

JAMES C. McCOY.